Sept. 20, 1955 V. L. DARBY 2,718,366
AILERON-SPOILER MECHANISM
Filed March 31, 1953 2 Sheets-Sheet 1
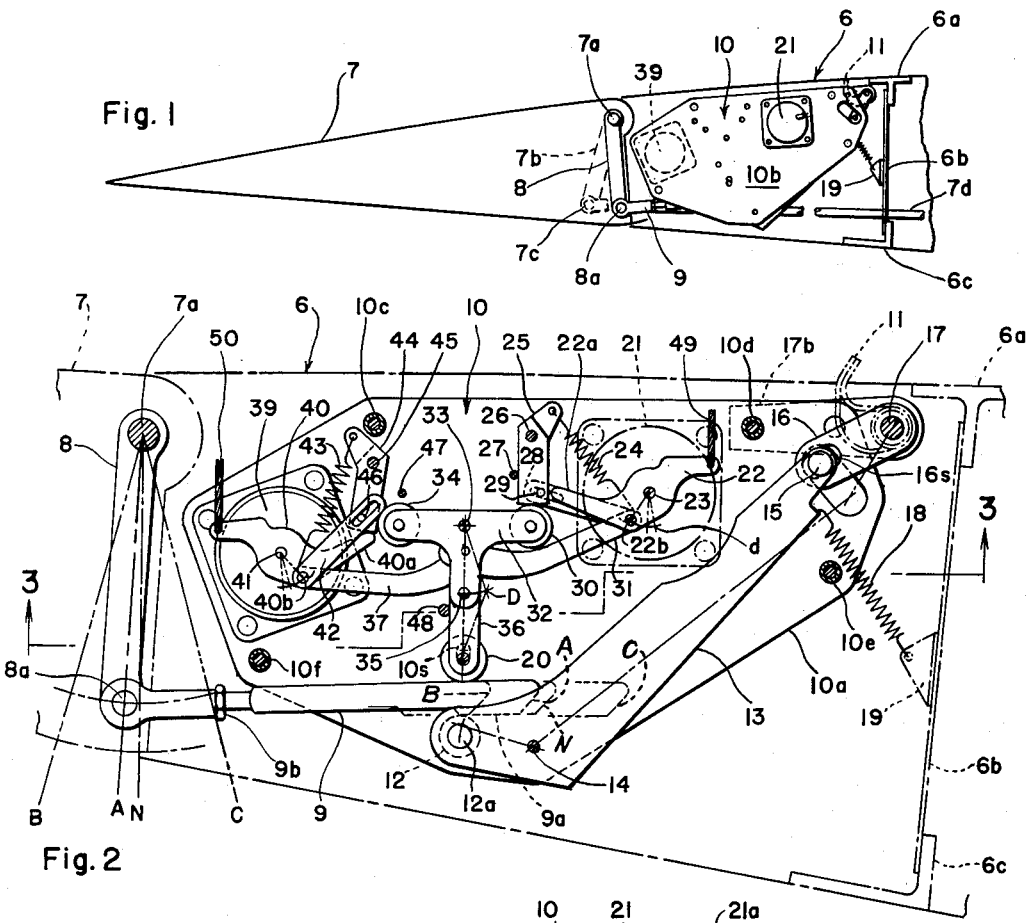
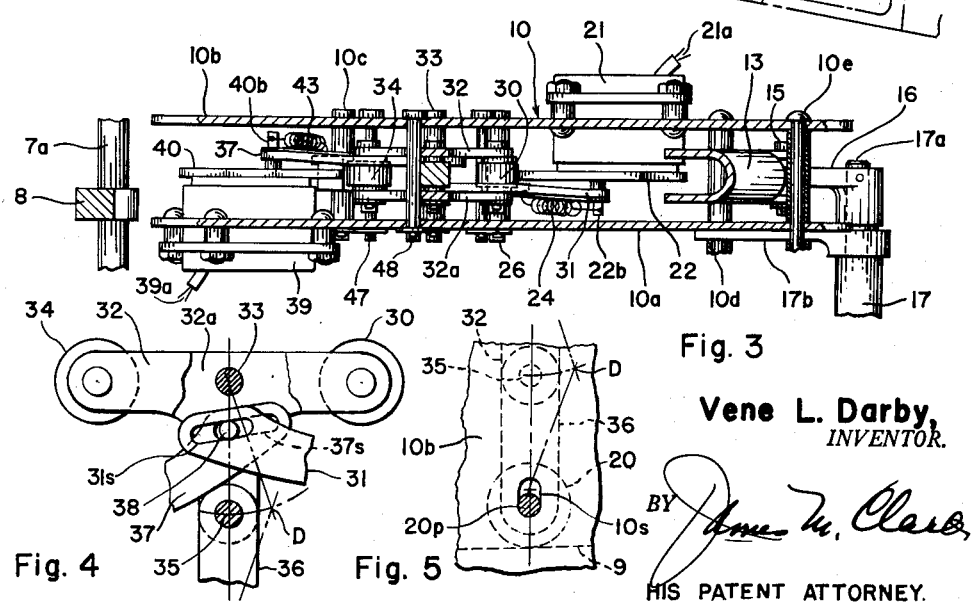
Vene L. Darby,
INVENTOR.
BY James M. Clark
HIS PATENT ATTORNEY.

Vene L. Darby,
INVENTOR.

HIS PATENT ATTORNEY.

United States Patent Office 2,718,366
Patented Sept. 20, 1955

2,718,366

AILERON-SPOILER MECHANISM

Vene L. Darby, Redondo Beach, Calif., assignor to North American Aviation, Inc.

Application March 31, 1953, Serial No. 345,769

8 Claims. (Cl. 244—90)

The present invention relates to controls and more particularly to improvements in the operating mechanisms for aileron control surfaces and the associated spoilers for aircraft wings and the like.

In the operation of aircraft, it has been found desirable to provide spoilers in connection with ailerons or other lateral control means in order to improve the flight characteristics of the airplane and its lateral control system. In such installations, the spoilers are projected upwardly into the airstream flowing along the upper surface of the wing as the aileron on that side of the wing is moved upwardly. As its name implies the purpose of the spoiler is to disturb the smooth airflow with an accompanying reduction in lift and to increase the drag on a wing tip at the same time that the aileron on the same wing is turned upward to make the upturned aileron more effective. A number of arrangements and mechanisms for accomplishing the concurrent projection of the spoiler with upward movement of the aileron has been proposed and used, but for various reasons these prior mechanisms have not proven completely satisfactory, particularly with respect to certain undesirable aileron conditions generally known as "upfloat."

The present invention is directed to an improved mechanism whereby the pilot at will can provide for the automatic projection of the spoiler upon upward movement of the aileron, or alternatively, he can lock the spoiler in its retracted position such that it is inoperative when the aileron is projected upwardly.

The present invention relates primarily to the mechanism for automatically actuating the spoiler as may be desired for varying flight conditions under which there is encountered "aileron up-float" effects arising from the high aerodynamic loads on ailerons and similar control surfaces. In high speed aircraft having swept-back wings, aileron "up-float" tends to cause a moment about the C. of G. which acts like the normal elevator action and disturbs the balance. This results from the sweep-back of the wing which places the ailerons considerably aft of the C. of G., thereby providing a moment arm and a resultant pitching action. These flight conditions may cause the control surfaces to become displaced slightly by elongation of the control cables and accompanying deflections in the structure. Where hydraulic actuators are employed to directly operate the control surfaces it has been found desirable to provide relief valves or slip clutches to prevent permanent deformation or damage to the air frame.

The tendency of the control surfaces to displace or "float" will vary appreciably according to flight conditions of speed, altitude and so forth. For example, it has been found that with the aircraft in a nose-up attitude or under high power loading, the ailerons may tend to float upwardly and under other flight conditions the tendency may be in the opposite direction. The applicant has found the use of spoilers remedies this condition to an appreciable extent by altering the airflow over the surface. Such displacement of the control surface does not result from a controlling action but rather from a tendency of the surface to reposition itself from the loads which have been imposed upon it. While the arrangement of the spoilers disclosed herein has proven satisfactory, it may be desirable in other installations to vary the location of the spoilers or the extent or the area influenced thereby in order to provide a more effective installation, or alternatively the spoilers may be required on either the upper and lower surfaces, or both.

It is, accordingly, a major objective of the present invention to provide an improved lateral control system for an aircraft which includes an automatically projectible spoiler. A further object resides in the provision of improved mechanism whereby a spoiler is projected when the associated aileron is moved into an "up" position. It is a still further object of the present invention to provide such an improved mechanism in which the pilot can at any time make the automatic spoiler projecting mechanism inoperative when he desires. It is also an object to provide improved mechanism of the type described which includes a reciprocating camming link which is engageable with a spoiler actuating lever, and its engagement therewith selectively made operative or inoperative by means of a solenoid-actuated toggle linkage. A further object resides in providing manual means for operating the solenoid elements in the event of failure of the electric power source or other cause of inoperativeness of the solenoids. Still further objects of the present invention include improved and positive acting means for maintaining the toggle linkage in either of its positions by means of suitable locking elements, which together with the toggle linkage, are provided with novel lost-motion means.

Other objects and advantages of the present invention, both with respect to its general arrangement, and the details of its respective parts, will become apparent to those skilled in the art after reading the following description, taken in conjunction with the accompanying drawings, foming a part hereof, in which:

Fig. 1 is a transverse elevational view of the trailing portion of a wing showing an aileron with an associated spoiler and a form of the improved spoiler actuating mechanism;

Fig. 2 is an enlarged view of the same showing the spoiler actuating mechanism;

Fig. 3 is a sectional view of the mechanism as taken along the lines 3—3 of Fig. 2;

Fig. 4 is a fragmentary view, to an enlarged scale, of the toggle linkage; and

Fig. 5 is a similar detailed view of the lower roller-carrying portion of the same.

Figure 2A:
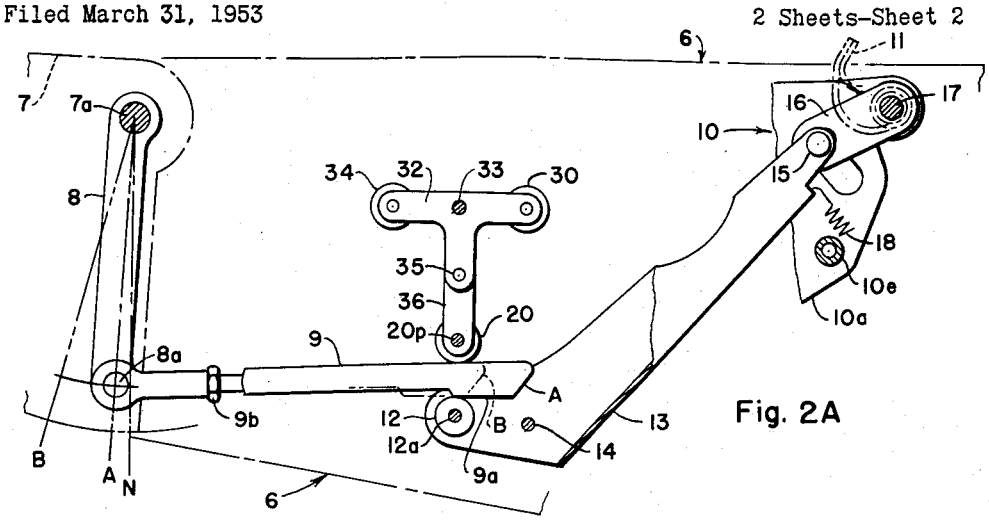
Fig. 2A is a similar view showing the automatic spoiler projection for two "up" aileron positions.

Referring now to Fig. 1, a relatively fixed airplane wing 6 is provided with a rear spar comprising the upper and lower chords 6a and 6c and the intermediate web portion 6b. To the trailing portion of the fixed wing 6, there is pivotally mounted an aileron 7 at the aileron hinge pivot 7a, and an arm 8 attached thereto is pivoted at 8a to a camming link 9 for the automatic actuation through the mechanism 10 of a spoiler 11 disposed slightly aft of the spar chord 6a. The link 9 has a cam surface 9a and adjustment means 9b in the form of the threaded terminal and lock nut. It will be understood that the aileron is operated in a conventional manner by means of the lever 7b and the actuating push-pull rod 7d pivoted thereto at 7c, as shown in Fig. 1.

The present improved mechanism comprises a selectively automatic control for spoilers for use in conjunction with an aileron installation to improve their high speed aerodynamic characteristics, operating automatically in response to aileron movement. The spoiler elements 11 are projected from the upper surface of the wing 6 ahead of the aileron 7 during the initial upward deflection of the aileron, remaining "up" throughout the remaining upward travel of the aileron. The spoiler elements may preferably be a series of small fingers which are projected through a row of slots in the upper surface by rotation of the torque tube 17 extending approximately 3/8" above the mold line of the wing. The projecting portions may preferably be made of heavy gauge sheet material shaped in the form of the numeral 6, the fingers forming the tail of the numeral being about 3/8" wide and about 1" apart. The spoilers 11 automatically retract when the aileron 7 is returned to the neutral position shown in Fig. 1 and no action of the spoilers results from downward aileron travel. By this improved mechanism 10, movement of the aileron automatically results in actuation of the spoiler elements 11 to provide the required action to obtain the desired aerodynamic stabilization and to overcome aileron "upfloat" tendencies.

The spoiler control unit 10 may preferably be installed in the trailing portion of the wing 6 adjacent the inboard end of the aileron 7. The arm 8 pivoted at the aileron hinge point 7a actuates the control unit as the aileron moves, which in turn operates (through a torque tube 17 having a reduced portion 17a, journalled in the bearing bracket 17b, shown in Figs. 2 and 3), the series of spoiler elements 11 arranged spanwise along the wing for projection into the airstream through suitable slots in the upper wing skin. These spoiler elements 11 retract completely within the mold line of the airfoil to form a flush surface when in retracted or inoperative position. Pilot operable means in the form of a rotary electric solenoid 21 is provided for rendering the unit inoperative to withhold the spoiler action and further pilot operable means in the form of a second solenoid 39 is provided for returning the unit to an operative condition. The control unit 10 comprises a series of improved linkages and levers, as more fully described below, operable in conjunction with the pair of rotary solenoids contained between a pair of side plates 10a and 10b, and which cooperate to form an open support and partial housing. The actuator units 21 and 39 may be of the so-called "Ledex" rotary solenoid type as manufactured by G. H. Leland, Inc., of Dayton, Ohio, or other suitable rotating means may be provided.

As more particularly shown in Figs. 2 and 3, the improved control mechanism 10, includes as stated above, the camming link 9 attached by the pivot 8a to the arm 8 pivoted about the aileron hinge point 7a, the link 9 being provided with a cam surface at 9a for engagement with a bearing roller 12 carried by and pivoted at 12a upon the arm 13 in turn pivotally mounted at 14 upon the side plates 10a and 10b. The opposite end of the arm 13 is pivotally attached at 15 to a further but smaller arm 16 secured to the spoiler torque shaft 17, the terminal portion of the small arm 16 being provided with a slot 16s with which the pivot 15 is engaged. The side plates 10a and 10b which form the housing for the actuating mechanism are spaced and maintained in their spaced positions by the spacing bolts and separators 10c, 10d, 10e, and 10f, and the spacing bolt 10e additionally serves as the limiting stop for the arm 13 when rotated into the extreme retracted position of the spoiler 11. The spoiler outline is indicated in the construction lines 11 in Fig. 2 in their extended position, from which they are retracted by the tension spring 18 anchored by the clip 19 to the spar web 6b when the aileron is again moved downward.

An upper bearing roller 20 having a pivot pin 20p vertically guided within the slots 10s in the side plates 10a and 10b, as more clearly shown in Fig. 5, rollingly engages the upper surface of the camming link 9 to maintain its cam portion 9a in contact with the lower roller 12. As indicated above, the stop 10e on the control housing limits the travel of the arm 13 and the spoilers 11 and rotation of the aileron torque shaft 7a results in chordwise reciprocation of the cam link 9 by virtue of its pivotal connection to the arm 8. In Fig. 2, the neutral position of the lever 8 is indicated at N, the slightly "up" aileron position at which the spoiler 11 reaches full "up" position is indicated by the letter A, and the full "up" and "down" positions of the aileron 7 and its ram 8 are indicated by the lines B and C, respectively.

In the neutral position of the lever 8, as indicated by the letter N, the camming link 9 occupies a position slightly to the right of that shown in Fig. 2, in which its camming portion 9a extends to the right of and does not engage the roller 12; and the arm 13 has been permitted to be rotated in the clockwise direction slightly about its pivot 14 by the tension spring 18 attached to the spar web 6d by the clip bracket 19, into the retracted position of the spoiler at which the arm 13 rests against the stop 10e. As the aileron 7 is moved upwardly, the arm 8 progressively moves from the neutral position N to the full line position at A and to its extreme "up" position B, the spoilers 11 reaching their full extended position at the full line position A and are maintained in the extended position to the full "up" aileron position B. As the link 9 is moved to the left in Fig. 2, and is restrained by the upper roller 20, the spoilers are projected by the downward pressure exerted by the cam face 9a upon the arm 13 and its roller 12, the face 9a being of sufficient length to maintain that pressure to the end of the upward aileron movement. Displacement of the link 9 to the right, however, upon the downward aileron movement, moves the cam surface 9a beyond the roller 12, permitting the spoiler elements to be retracted by the spring 18, and over-travel of the link 9 to the right (which occurs as the aileron is continued to be moved downwardly to the position C of the arm 8) is provided for in the length of the link as indicated by the dotted lines in this figure.

The spoilers 11 may be selectively rendered inoperative at the pilot's discretion by means of the rotary solenoid 21, energized through the leads 21a and controlled by a suitable switch (not shown) accessible to the pilot in the cockpit of the airplane. The solenoid 21, which has built into it suitable means for converting linear to rotary motion, serves to break the toggle linkage 32—36 permitting the upper roller 20, carried by the toggle linkage, to be withdrawn from its guiding or bearing contact with the upper surface of the link 9. The solenoid 21 is provided with a rotatable plate 22, mounted upon its shaft 23, having an integral keeper or blocking portion 22a rotatable with the lever 22 about the axis of the pivot 23, when actuated by the solenoid. A blocking bell-crank or cam lever 25 is pivotally mounted upon the unit 10 at the pivot 26, being urged into its extreme clockwise position by the tension spring 24 pivotally connected to the lever 22 at the pivot 22b. The arm 22 is also linked to the opposite end of the bell-crank 25 by the slotted link 28 pivotally interconnected between the previously mentioned pivot pin 22b and the pivot 29 on the bell-crank 25, the travel of which is limited by the stop 27. In Fig. 2, the toggle linkage 32—36 is shown in its aligned operative position in which the roller 20 bears down against the upper surface of the link 9, and the roller 30, carried by the T-shaped lever or double bell-crank 32, is blocked by the lower edge of the blocking bell-crank 25 as a result of the rotation of the rotary solenoid 21 into its extreme clockwise position as shown in which the bell-crank 25 also has been pushed into its extreme clockwise position against the stop 27, by the keeper portion 22a of the lever 22.

When the solenoid 21 is energized, its initial rotation of the plate 22 in the counter-clockwise direction also moves the keeper 22a in the counter-clockwise direction, or toward the right, to clear the lower end of the bell-crank 25, pivoted at 26. Continued rotation of the solenoid 21 next actuates the link 28 pivotally mounted at 22b upon the plate 22 and secured to the bell-crank 25 at the pivot 29 at its slotted end. This slot in the link 28 at the pivot 29 is provided to permit some lost-motion before the pin 29 is engaged in order that the keeper 22a may be initially cleared to permit the bell-crank 25 to be rotated counter-clockwise to clear the roller 30 carried by the arm on T-shaped lever 32, which is pivotally mounted at 33.

A link 31 is also connected, at the pivot 22b, to the plate 22, the opposite end of the link 31, as more particularly shown in Fig. 4, being provided with a slot 31s within which is positioned the pin 38 attached to the T-shaped lever 32 between the toggle pivots 33 and 35. The T-shaped portion of the toggle linkage comprises the front and rear plates 32 and 32a, between which are carried the rollers 30 and 34 and the ends of the links 31 and 37. The continued counter-clockwise rotation of the solenoid 21 draws the link 31 to the right and upon reaching the limit of the slot 31s it engages the pin 38 to rotate the member 32 about its pivot 33. This rotation breaks the toggle linkage arrangement composed of the members 32 and 36 pivotally joined at 35, the link 36 carrying the roller 20 at its lower extremity upwardly, as guided by the fixed slot 10s in the side plates 10a and 10b of the control unit. Rotation of the link 32 about its pivot 33 also moves the roller 34 downwardly in the counter-clockwise direction about the pivot 33 to a position in which it rolls under and is engaged by the counter-clockwise rotation of the second blocking bell-crank 44, rotatable about its pivot 45, under the influence of the tension spring 43. The second bell-crank 44 is rotated to its blocking position, at rest against the stop 47, at which point the roller 34 is in contact with the lower end of the bell-crank 44 which serves to retain the toggle linkage 32—36 in the broken position with the center pivot 35 moved to the right to its alternate position as indicated by the letter D. The pivot 22b on the plate 22 of the solenoid 21 has by this time been moved to the corresponding position indicated by the letter d. When the toggle linkage 32—36 is thus broken, the spoilers are rendered inoperative and remain in their retracted position under the influence of the spring 18, under which condition the lever arm 13 remains in its extreme clockwise position at which its roller 21 is unaffected by the link 9 which is free to rise about its pivot 8a, when its camming portion 9a engages the roller 12, due to the clearance provided above the link 9 by the upwardly spaced position of the upper roller 20.

The second rotary solenoid 39 is provided to permit the pilot to re-engage the automatic spoiler control, being similarly controlled through the electrical leads 39a. A rotatable plate element 40 mounted upon the shaft 41, of the solenoid 39, includes a keeper portion 40a integral therewith and the initial rotation of the plate member 40, in the clockwise direction as the solenoid is energized and rotated, clears the keeper portion 40a from its contact with the lower end of the bell-crank 44. Continued rotation of the solenoid arm plate 40 in the clockwise direction moves the link 42, pivotally attached at 40b to the plate member 40, until the pin 46 is picked up at the limit of the slot in the upper end of the link 42, thereby rotating the bell-crank 44 in the clockwise direction about its pivot 45. Further rotation of the solenoid plate member 40 actuates the link 37 which is also pivotally secured at 40b and has its opposite end provided with a slot 37s, as more clearly shown in Fig. 4, which also engages the pin 38 on the upper member 32 of the toggle linkage 32—36. The arm or link 37 serves to move the toggle linkage back from its broken position indicated in Fig. 2 by the letter D, back to the straight line or aligned position shown in the full lines in Figs. 2 and 4, coming to rest against the stop 48 and returning the roller 20 down to its lowered position in which it contacts the upper surface of the camming link 9. The first rotary solenoid 21 and its associated linkages are automatically reset by the operation of the second solenoid 39, and causes the toggle linkage to return to its aligned position, the spring 24 returning the bell-crank 25 into contact with its stop 27.

In the event of failure of the electrical power source and inoperativeness of either or both of the rotary solenoids 21 and 39, the solenoid arm plates 22 and 40 are provided with extending portions to which the manually-operated cables 49 and 50 are attached. These cables extend to a position within the cockpit accessible to the pilot and it will be obvious that the solenoid arm 22 may be rotated into a counter-clockwise position, at which manual pull upon the cable 49 rotates the bell-crank 25 into an unblocking position with respect to the roller 30, and the arm 31 causes breaking of the toggle linkage 32—36. Accordingly, as the result of pull on the cable 49, the toggle is broken and automatic projection of the spoiler 11 is prevented as the aileron 7 is rotated into its "up" position. Similarly, manual pull upon the cable 50 imparts clockwise rotation to the solenoid arm plate 40 and return of the toggle linkage into its aligned position in which the spoiler is automatically projected upon "up" aileron movement and the first blocking bell-crank lever 25 is returned and reset to the spoiler-operative position.

Figure 2B:
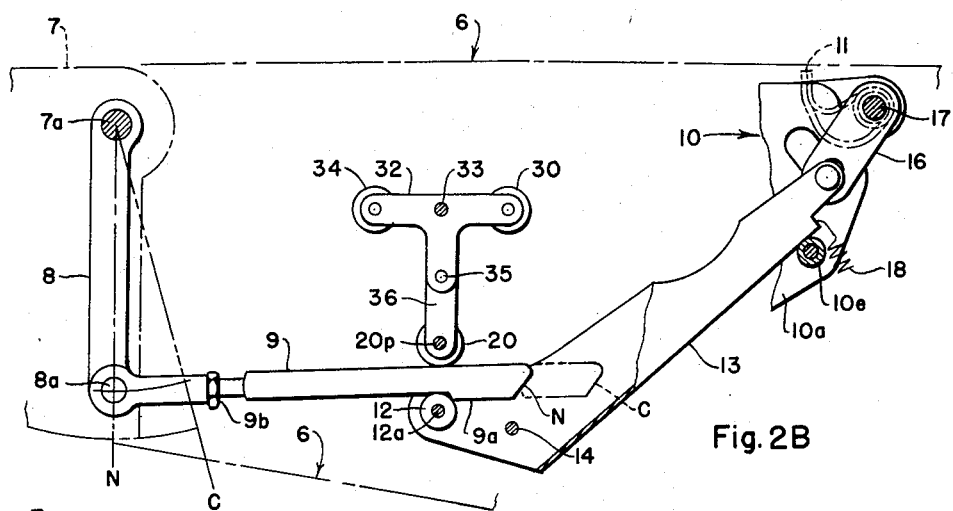
Fig. 2B is a similar view showing automatic retention of the spoiler in the retracted position for neutral and "down" aileron positions.
Figure 2C:
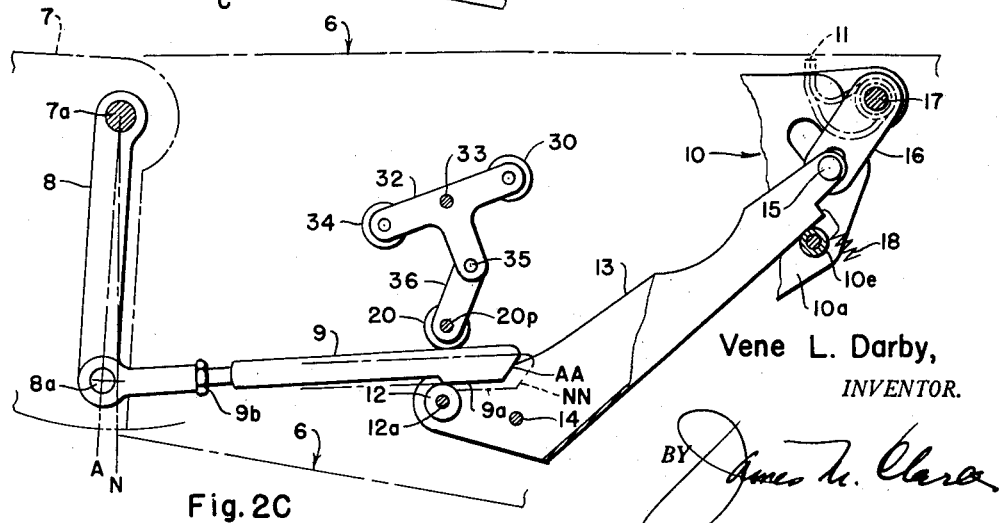
Fig. 2C is a further view of the same with the spoiler locked in its retracted or inoperative position when the aileron is projected upwardly.

The camming action of link 9 may be seen to best advantage in Figs. 2A, 2B and 2C. In the first of these figures, the locking mechanism is in its engaged or automatic condition in which the roller 20 prevents upward movement of the camming link 9. In the full line showing A of the link 9 in this figure corresponding to a small upward aileron deflection, it will be noted that the wider portion of the cam link 9 has pushed the roller 12 downwardly causing projection of the spoiler 11. The further upward deflection of the aileron 7 to the position B of the link 8 moves the link 9 rearwardly or to the left in this figure but its wider portion continues to bear downwardly against the roller 12 with the link 9 in the dotted line position B in which the spoiler 11 is still maintained in its projected position. When the aileron is returned to the neutral position N shown in full lines in Fig. 2B, the wider portion of the link 9 has passed beyond or forward of the rollers 12 and 20 with the result that the spoiler actuating lever 13 is permitted to rotate in the clockwise direction about its pivot 14 with the roller 12 moving upwardly against the narrower portion of the camming link, thereby causing retractive movement of the spoiler 11. As the aileron is continued to a down position such as indicated at C, the camming link 9 moves further in the forward direction but its narrower portion is still disposed between the rollers 12 and 20 with the result that the spoiler remains in its retracted position. Fig. 2C shows the blocking mechanism retracted such that the roller 20 is withdrawn upwardly permitting the camming link 9 to ride freely over the roller 10 without imparting rocking or rotation to the actuating lever 13. With the aileron deflected upwardly through a relatively small angle to the position A it will be noted that even though the wider portion of the camming link 9 is disposed between the rollers 12 and 20, the spacing of the latter is now sufficient such that there is no camming effect of the link 9 and the lever 13 is permitted to remain in the retracted position of the spoiler in which it is held by the tension spring 18. Similarly when the aileron 7 is brought back to its neutral position N and the link 9 is moved slightly forward of its position AA represented by the full lines, it assumes the position NN indicated by the construction lines in which the lever 13 and the spoiler remain retracted.

Other forms and modifications of the present invention, both with respect to its overall general arrangement and the details of its several parts, which become obvious to those skilled in the art after reading the foregoing description, are intended to come within the scope and spirit of the present invention as more particularly set forth in the appended claim.

I claim:
1. In aircraft, a relatively fixed wing, an aileron mounted upon said wing, control means operatively connected to said aileron for imparting control movements thereto, a spoiler mounted upon said wing, an element having a camming portion connected to said aileron for movement therewith, spoiler actuating means operatively connected to said spoiler, roller means selectively engageable with said camming elements arranged in such manner that said roller means normally maintains said camming element portion in operative engagement with said spoiler actuating means whereby upward movement of said aileron by said control means imparts projecting movement to said spoiler through said camming element portion maintained in operative engagement with said spoiler actuating means, said camming element portion arranged with respect to said spoiler actuating means such that downward movement of said aileron does not impart projecting movement to said spoiler notwithstanding said roller means being in its normally engaged position, and means operatively connected to said roller means selectively operable to disengage said roller means from said camming element portion for making said camming element portion ineffective in its engagement with said spoiler actuating means in upwardly deflected positions also of said aileron.

2. In aircraft, a relatively fixed wing, an aileron movably mounted upon said wing, control means operatively connected to said aileron for imparting control movements thereto, a spoiler movably mounted upon said wing forward of said aileron, an element having a camming portion pivotally connected to said aileron for movement therewith, spoiler actuating means operatively connected to said spoiler, said spoiler actuating means including a lever engageable with said camming element portion arranged in such manner that movement of said aileron normally imparts reciprocating movement to said camming element portion and pivotal movement of said spoiler actuating means lever dependent upon aileron rotational movement and camming element reciprocating movement, manually controllable positioning means for defining the path of reciprocating movement of said camming element portion whereby said camming element portion is normally arranged with respect to said lever of said spoiler actuating means such that upward movement of said aileron also imparts upward movement to said spoiler, and in the normally engaged condition of said positioning means downward movement of said aileron does not impart any movement to said spoiler due to the profile of said camming element portion in that portion of its reciprocating movement, said positioning means capable of retraction and disengagement from said camming element portion whereby said camming element portion becomes ineffective also in its engagement with said lever of said spoiler actuating means in upwardly deflected positions of said aileron.

3. An aircraft wing having an aileron and a spoiler movably mounted thereon, a first element operatively connected to said aileron for movement therewith, the operative connection of said element to said aileron arranged such that movement of said aileron imparts movement to said element in a substantially rectilinear path, said element formed such that its width differs along its length, a spoiler actuating element operatively connected to said spoiler, positioning means normally disposed in such manner adjacent said path of rectilinear movement as to urge said first element into engagement with said spoiler actuating element for automatic projection of said spoiler upon upward movement of said aileron as determined by the width of said first element making such engagement, and manual control means for selectively moving said positioning means to a position away from said first element in which movement of said first element initiated by aileron upward movement is not translated into movement of said spoiler.

4. An aircraft wing having an aileron and a spoiler movably mounted thereon, a camming element operatively connected to said aileron for concurrent movement therewith, a spoiler actuating element operatively connected to said spoiler, bearing means movably supported upon the wing normally disposed in such manner as to maintain said camming element in engagement with said spoiler actuating element for the automatic projection of said spoiler when said aileron is moved in one direction only from its neutral position and further means for moving said bearing means to a position in which movement of said camming element initiated by aileron movement in said same direction is not translated into movement of said spoiler by said spoiler actuating element.

5. An aircraft wing having an aileron and a spoiler pivotally mounted thereon, a camming element operatively connected to said aileron for concurrent movement therewith, a spoiler actuating element operatively connected to said spoiler, roller means normally disposed in such manner as to force said camming element into engagement with said spoiler actuating element for automatic upward projection of said spoiler when said aileron is moved upwardly from its neutral position, and selectively controllable means for retracting said roller means to a position in which movement of said camming element initiated by aileron upward movement is not translated into like upward movement of said spoiler by said spoiler actuating element.

6. A wing having a control surface movably mounted adjacent its trailing edge, and an element movably mounted upon said wing for projection into the airstream, means for automatically imparting concurrent movements of said control surface and said projectible element comprising a contoured element operatively connected to said control surface for movement therewith, bearing means movably supported upon said wing normally engaging a first side of said contoured element for defining the path of movement thereof, a member pivotally mounted upon said wing engageable with an opposite side of said contoured element and operatively connected to said projectible element whereby upward movement of said control surface initiates like upward movement of said projectible element, and manual means for disengaging said bearing means from engagement with said contoured element whereby said control surface may be moved upwardly without concurrent movement of said projectible element.

7. In a wing having a control surface pivotally mounted adjacent its trailing edge, and a spoiler pivotally mounted upon said wing for rotation into the airstream, automatic mechanism for imparting concurrent upward movements of said control surface and said spoiler comprising a contoured element operatively connected to said control surface for movement therewith, a member pivotally mounted upon said wing having a first portion engageable with said contoured element and a second portion of said member operatively connected to said spoiler, and selective control means engageable with said contoured element for causing the same to impart projection of said projectible element upon movement of said control surface in a predetermined direction.

8. In a wing having a control surface pivotally mounted adjacent its trailing edge, and a spoiler pivotally mounted upon said wing for rotation into the airstream, mechanism for imparting concurrent upward movements of said control surface and said spoiler comprising a contoured camming element operatively connected to said control surface for movement therewith, a member pivotally mounted upon said wing having a first portion engageable with said contoured camming element and a second portion of said member operatively connected to said spoiler, and control means including a toggle linkage selectively engageable with said contoured camming element for either causing said element to rotate said spoiler into the airstream upon movement of said control surface in the upward direction, or for permitting upward movement of said control surface without like movement of said spoiler.

References Cited in the file of this patent

UNITED STATES PATENTS

| Number | Name | Date |
|---|---|---|
| 1,696,582 | Rankin | Dec. 25, 1928 |
| 1,890,012 | Alfaro | Dec. 6, 1932 |
| 1,964,418 | Alfaro | June 26, 1934 |
| 2,338,379 | Henke | Jan. 4, 1944 |
| 2,402,118 | Ashkenas | June 18, 1946 |
| 2,549,044 | Ashkenas | Apr. 17, 1951 |

FOREIGN PATENTS

| Number | Country | Date |
|---|---|---|
| 883,096 | France | June 23, 1943 |